(12) United States Patent
Novak

(10) Patent No.: US 10,060,528 B2
(45) Date of Patent: Aug. 28, 2018

(54) HYDRAULIC ACTUATING DEVICE FOR A POSITIVE-LOCKING SHIFING ELEMENT OF A TRANSMISSION

(71) Applicant: ZF Friedrichshafen AG, Friedrichshafen (DE)

(72) Inventor: Rainer Novak, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 270 days.

(21) Appl. No.: 14/970,604

(22) Filed: Dec. 16, 2015

(65) Prior Publication Data
US 2016/0169381 A1    Jun. 16, 2016

(30) Foreign Application Priority Data

Dec. 16, 2014 (DE) .................. 10 2014 226 022

(51) Int. Cl.
*F16H 61/30* (2006.01)
*F15B 15/14* (2006.01)
(Continued)

(52) U.S. Cl.
CPC ........... *F16H 61/30* (2013.01); *F15B 15/204* (2013.01); *F16H 63/3023* (2013.01);
(Continued)

(58) Field of Classification Search
CPC ............. B60Y 2400/421; F15B 11/036; F15B 15/084; F15B 15/1404; F15B 15/1447; F15B 15/149; F15B 15/204; F15B 15/224; F16H 61/30; F16H 63/3023; F16H 2063/303
See application file for complete search history.

(56) References Cited

U.S. PATENT DOCUMENTS 7,083,034 B2    8/2006   Bader
7,516,691 B2    4/2009   Baur et al.

FOREIGN PATENT DOCUMENTS

DE      2830416 A1    1/1980
DE     10321280 A1   12/2004
(Continued)

OTHER PUBLICATIONS

German Patent Office Search Report, dated Oct. 5, 2015.

*Primary Examiner* — Logan Kraft
(74) *Attorney, Agent, or Firm* — Dority & Manning, P.A.

(57) ABSTRACT

A hydraulic actuating device is provided for a positive-locking shifting element of a transmission with a cylinder, in which a piston is arranged in a manner displaceable between a first end position and a second end position. The piston is a stepped piston and, with the cylinder, bounds an additional pressure chamber, which is connected to a first pressure chamber and/or a second pressure chamber through at least one hydraulic line. The volume of the additional pressure chamber decreases during an actuating movement of the piston in the direction of the first end position and increases during an actuating movement of the piston in the direction of the second end position. The degree of locking of the connection between the additional pressure chamber and the first pressure chamber and/or the second pressure chamber increases through the cylinder from a defined actuating path of the piston prior to reaching the first end position up to the first end position.

4 Claims, 4 Drawing Sheets

(51) Int. Cl.
  *F15B 15/20*  (2006.01)
  *F16H 63/30*  (2006.01)
  *F15B 11/036*  (2006.01)
  *F15B 15/22*  (2006.01)

(52) U.S. Cl.
  CPC ....... *B60Y 2400/421* (2013.01); *F15B 11/036* (2013.01); *F15B 15/149* (2013.01); *F15B 15/1447* (2013.01); *F15B 15/224* (2013.01); *F16H 2063/303* (2013.01)

(56) References Cited

FOREIGN PATENT DOCUMENTS

| DE | 102004022723 |  | 11/2005 |
| --- | --- | --- | --- |
| DE | 102010042657 | A1 | 4/2012 |
| DE | 102012220417 | A1 | 5/2014 |

HYDRAULIC ACTUATING DEVICE FOR A POSITIVE-LOCKING SHIFING ELEMENT OF A TRANSMISSION

FIELD OF THE INVENTION

The invention relates to a hydraulic actuating device for a positive-locking shifting element of a transmission.

BACKGROUND

For the presentation of different transmission ratios, transmissions of vehicle drive trains known from practice are typically formed with positive-locking and/or frictional-locking shifting elements for the connecting and disconnecting of transmission ratios. Positive-locking shifting elements are typically designed as claw shifting elements, which are subjected to actuating pressure through claw valves by hydraulic actuating devices of the transmission. Viewed physically, such claw valves represent so-called "hydraulic switches," through which the actuating pressure can be driven in the direction of a shifting element within short periods of operation, or the actuation of a shifting element can be switched off to the desired extent with short control and regulating periods. Upon the actuation of such claw valves, very high hydraulic performance can be withdrawn from a hydraulic pump provided with a hydraulic fluid for a determinable period of time, for example for 10 to 20 milliseconds. Through the high degree of withdrawal, under normal circumstances, as described in more detail below, there is an occurrence of unwanted excitations in the curve of the system pressure, typically in the form of pressure spikes, which may result in damages or a failure of sealing devices, in addition to a failure of the hydraulic pump. In addition, through the triggered changes to clutch pressures, converter pressures and the like, damages and failure symptoms in the area of connecting lines and the claw shifting elements themselves, along with undesired influences of other hydraulically supplied system components, are possible.

If there is a request for actuating a preferably positive-locking shifting element, with the approach known from practice, an actuating pressure or system pressure level is initially raised to the pressure level required for the displacement of the shifting element. Typically, the shifting element is subjected to the maximum system pressure, in order to, as requested, engage the shifting element or the claw in the shortest possible time. This is necessary, since positive-locking shifting elements typically feature the operating state necessary for the switching on of a claw shifting element, i.e. an essentially load-free and nearly synchronous operating state, only within a limited time window. If the actuating pressure level necessary for the switching on of the positive-locking shifting element or the claw shifting element, as the case may be, is reached, the control command is carried out for the claw valve, preferably designed as a solenoid valve, which switches over after the expiration of a delay period for approximately 10 milliseconds. After the switching over of the claw valve, the actuating pressure is applied in the area of a pressure chamber of the claw shifting element. This in turn leads to the fact that the claw shifting element or an actuating piston of the claw shifting element is displaced starting from its first end position in the direction of its second end position. Thereby, the volume of the pressure chamber subjected to actuating pressure and limited by the actuating piston of the claw shifting element increases, and the hydraulic fluid volume flowing into the pressure chamber creates a high flow disturbance in the area of the hydraulic actuating device of a transmission that drives system pressure, and causes a short-term decline in the curve of the system pressure.

If the actuating piston reaches its second end position and abuts against the end stop, a pressure peak occurs in the system pressure curve, which in turn leads to a high excitation of the hydraulic system or the hydraulic actuating device, as the case may be. Due to the high degree of excitation, a transient oscillation in the direction of the actuating pressure level requested at the beginning of the displacement operation of the claw shifting element is adjusted with additional pressure peaks, the amplitudes of which are smaller than the amplitude of the pressure peak that occurs upon reaching the second end position of the actuating piston.

It is thereby problematic that a system pressure release valve, in the area of which the system pressure is adjusted, reacts to the decline in system pressure that arises during the displacement of the actuating pressure and reduces the associated throttle cross-section in order to increase the system pressure. For this reason, upon reaching the second end position of the actuating piston of the claw shifting element, the system pressure valve is throttled too strongly, in order to compensate for the occurrence of undesirably high pressure peaks upon reaching the second end position to a sufficient extent.

In order to avoid such excitations in the system pressure curve, which impair the functioning of a transmission on a long-term basis, there is, for example, the possibility of providing a highly dynamic, fast-switching safety valve in the area driving the system pressure of a hydraulic system of a transmission device.

However, it is thereby disadvantageous that such safety valves present additional component cost and must be designed in an accordingly large size in order to implement the desired high dynamics.

Additional capacities in the form of accumulators in the area of the transmission driving the system pressure represent an additional possibility for avoiding undesired pressure peaks or excitations in the system pressure. Such pulsation dampers are sometimes made of plastic, and are installed directly in the area of the hydraulic pump. Notwithstanding this, there are also traditional spring-piston accumulators, by means of which there is compensation for pressure peaks.

However, it is disadvantageous that such solutions are once again characterized by increased component cost. Furthermore, the spring-piston accumulator provided for reducing pressure peaks in the area driving the system pressure impairs system pressure dynamics, since the function of the spring-piston accumulator lowers spontaneity in control, due to a slower build-up of system pressure.

With an additional approach known from practice, for actuating a positive-locking shifting element of a transmission, upon the presence of a request for actuating the positive-locking shifting element in the area of a piston of the shifting element, which is designed to be displaceable between a first end position and a second end position, an actuating pressure of the positive-locking shifting element is applied, and the actuating piston is, depending on the current request, thereby guided in the direction of its first or its second end position, which corresponds to a closed operating state of the shifting element or to an open operating state of the shifting element, as the case may be.

The actuating pressure applied at the actuating piston is reduced prior to reaching the first end position or prior to reaching the second end position of the actuating piston, and, upon reaching the first end position or upon reaching the second end position of the actuating piston, in comparison with the approaches described above, an excitation in the curve of the actuating pressure is reduced. Thus, damages or a failure of a hydraulic pump, sealing devices, the connecting lines and/or a positive-locking shifting element or a claw shifting element itself, along with undesired influences in other hydraulically supplied system components of a transmission, are avoidable.

However, within the framework of the displacement speeds of the actuating piston that arise during the actuation of a claw shifting element and the usual sampling times in the transmission, this approach is often difficult to carry out, particularly since an actuating pressure applying at the actuating piston is optimally reduced in a corresponding measure shortly prior to the stopping of the piston at the mechanical stop, in order to not prematurely dampen the actuation of the claw shifting element.

SUMMARY OF THE INVENTION

As such, the present invention is subject to a task of providing a hydraulic actuating device for a positive-locking shifting element of a transmission, by means of which a positive-locking shifting element is actuated to the desired extent, and the disadvantages described above known from practice are avoided. Additional objects and advantages of the invention will be set forth in part in the following description, or may be obvious from the description, or may be learned through practice of the invention.

In accordance with the invention, this task is solved with a hydraulic actuating device with the characteristics described herein.

The hydraulic actuating device in accordance with the invention for a positive-locking shifting element of a transmission comprises a cylinder, in which a piston is arranged in a manner displaceable between a first end position that corresponds to a closed operating state of the shifting element, and a second end position that corresponds to an open operating state of the shifting element. The piston is displaceable by applying actuating pressure in the area of a first active surface, which is bounded with the cylinder of a first pressure chamber, in the direction of the first end position, while the piston is displaceable by applying the actuating pressure in the area of a second active surface, which is bounded with the cylinder of a second pressure chamber, in the direction of a second end position.

In accordance with the invention, the piston is designed as a stepped piston and, with the cylinder, bounds an additional pressure chamber, which is connected to the first pressure chamber and/or the second pressure chamber through at least one hydraulic line at least across a defined actuating path of the piston, whereas the volume of the additional pressure chamber decreases during an actuating movement of the piston in the direction of the first end position and increases during an actuating movement of the piston in the direction of the second end position. The connection between the additional pressure chamber and the first pressure chamber and/or the second pressure chamber in the first end position of the piston is at least partially locked by the cylinder, and whereas the degree of locking of the connection between the additional pressure chamber and the first pressure chamber and/or the second pressure chamber increases through the cylinder from a defined actuating path of the piston prior to reaching the first end position up to the first end position.

Thus, in a structurally simple manner, it is achieved that, upon an actuating movement of the piston in the direction of the first end position and thus in the direction of the closed operating state of the shifting element, hydraulic fluid is pushed out from the additional pressure chamber in the direction of the first pressure chamber and/or in the direction of the second pressure chamber. Since the degree of locking of the connection between the additional pressure chamber and the first pressure chamber and/or the second pressure chamber increases through the cylinder from the defined actuating path of the piston prior to reaching the first end position up to the first end position, a throttling of the hydraulic fluid to be conducted from the additional pressure chamber is effected, which thus occurs shortly prior to reaching the first end position of the piston and becomes larger with the further increasing actuating path in the direction of the end position. The actuating movement of the piston is thus dampened or reduced, as the case may be, in the direction of the first end position of the piston to the desired extent without additional control and regulating expenditure, and all of the disadvantages known from practice are avoided in a structurally simple and cost-effective manner.

With an embodiment of the hydraulic actuating device in accordance with the invention that is simple to operate, the area of the second active surface is larger than the area of the additional active surface.

If the hydraulic line connecting the second pressure chamber to the additional pressure chamber includes a first section extending essentially in an axial direction of the piston into the piston and a second line section leading from the first line section in the direction of the additional pressure chamber and flowing into it, whereas the flow cross-section of the first line section for the presentation of a throttling in the area of the hydraulic line is preferably larger than the flow cross-section of the second line section, the hydraulic actuating device can be produced with little expenditure, in a simple and cost-effective manner.

An embodiment of the hydraulic actuating device in accordance with the invention that is structurally simple and can be operated with little control and regulating expenditure is characterized in that the hydraulic line connecting the first pressure chamber to the additional pressure chamber includes a first section extending essentially in an axial direction of the piston into the piston and a second line section flowing from the first line section in the direction of the additional pressure chamber.

With an embodiment of the hydraulic actuating device in accordance with the invention that can be operated to a desired extent, the sum of the areas of the second active surface and the additional active surface corresponds to the area of the first active surface.

Both the characteristics specified in the claims and the characteristics specified in the subsequent embodiments of the hydraulic actuating device in accordance with the invention are, by themselves alone or in any combination with one another, suitable for providing additional forms for the object in accordance with the invention.

BRIEF DESCRIPTION OF THE DRAWINGS

Additional advantages and advantageous embodiments of the hydraulic actuating device in accordance with the invention arise from the claims and the embodiments described below, with reference to the drawing in terms of principle, whereas, in the description of the various embodiments, for The following is shown:

DETAILED DESCRIPTION

Figure 1:
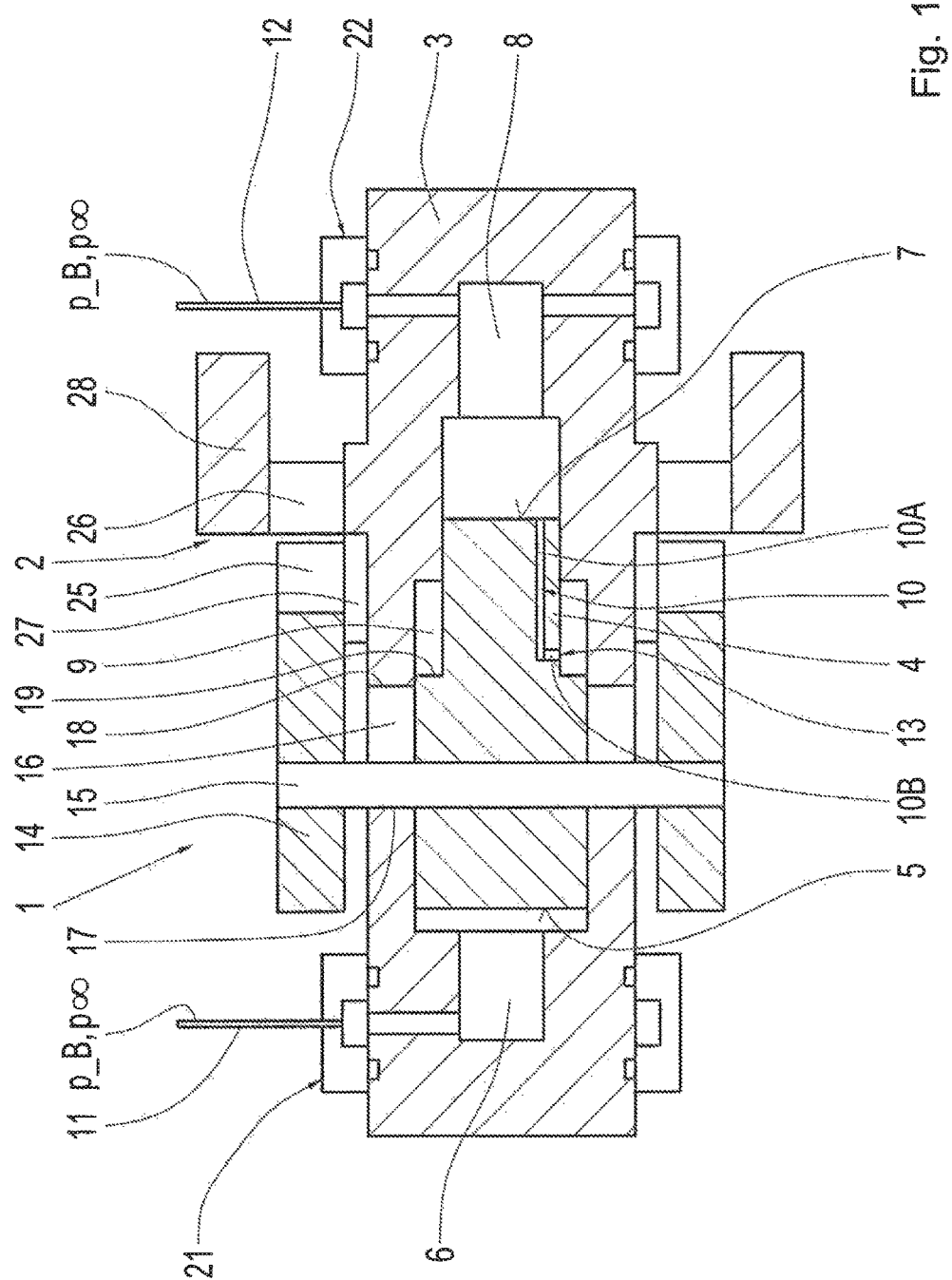
FIG. 1 a longitudinal sectional view of a first embodiment of the hydraulic actuating device in accordance with the invention in a first operating state.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 2:
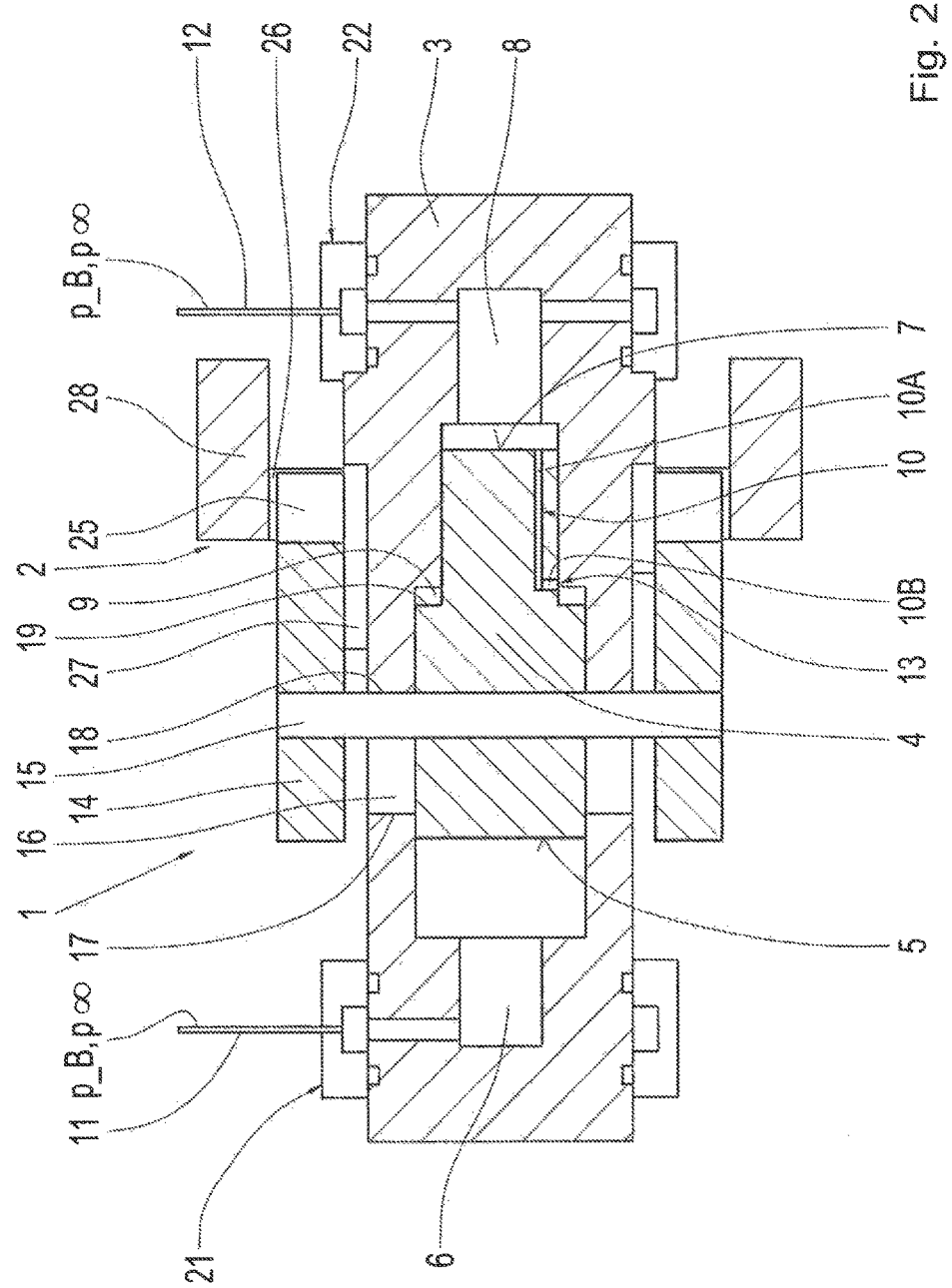
FIG. 2 a presentation corresponding to FIG. 1 of the actuating device in accordance with FIG. 1 in a second operating state.

FIG. 1 shows a highly schematic longitudinal section view of a hydraulic actuating device 1 for a positive-locking shifting element 2 of a transmission or a vehicle transmission with a cylinder 3, as the case may be (not shown in detail), in which a piston 4 is arranged in a manner displaceable between a first end position shown in FIG. 2, which corresponds to a closed operating state of the shifting element 2, and a second end position shown in FIG. 1, which corresponds to an open operating state of the shifting element 2. Thereby, the claw toothings 25, 26 of the shifting element halves 14, 28 of the positive-locking shifting element 2 are engaged with each other in a closed operating state of the positive-locking shifting element 2, while the claw toothings 25, 26 of the positive-locking shifting element 14 are disengaged in the open operating state of the positive-locking shifting element 2. For this purpose, the shifting element half 14 of the positive-locking shifting element 2 is, together with the piston 4, displaced in respect of the cylinder 3 and the additional shifting element half 28 in an axial direction. Furthermore, the shifting element half 14 is coupled through a guide toothing 27 in a torque-proof manner with the cylinder 3.

By applying an actuating pressure p_B in the area of a first active surface 5, which with the cylinder 3 bounds a first pressure chamber 6, the piston 4 is displaceable in the direction of the first end position. In contrast to this, by applying the actuating pressure p_B in the area of a second active surface 7 of the piston 4, which with the cylinder 3 bounds a second pressure chamber 8, the piston 4 is displaced in the direction of the second end position of the piston 4. The piston 4 is designed as a differential pressure piston or a stepped piston, and with the cylinder 3 bounds an additional pressure chamber 9, which is connected to the second pressure chamber 8 through a hydraulic line 10 over a defined actuating path of the piston 4. Thereby, the volume of the additional pressure chamber 9 decreases during an actuating movement of the piston 4 in the direction of the first end position, and increases during an actuating movement of the piston 4 in the direction of the second end position.

The hydraulic line 10 connecting the second pressure chamber 8 to the additional pressure chamber 9 includes a first section 10A extending essentially in an axial direction of the piston 4 into the piston 4 and a second line section 10B leading from the first line section 10A in the direction of the additional pressure chamber 9 and flowing into it, whereas the flow cross-section of the first line section 10A is preferably larger than the flow cross-section of the second line section 10B.

The connection between the additional pressure chamber 9 and the second pressure chamber 8 is partially blocked by the cylinder 3 in the first end position of the piston 4 shown in FIG. 2, whereas the degree of blocking of the connection between the additional pressure chamber 9 and the second pressure chamber 8 increases through the cylinder 3 from a defined actuating path of the piston 4 prior to reaching the first end position up to the first end position.

During the actuation of the piston 4, starting from the second end position shown in FIG. 1 in the direction of the first end position shown in FIG. 2, the actuating pressure p_B is applied through a hydraulic line 11 and a hydraulic rotary connector 21 in the area of the first pressure chamber 6 and thus at the first active surface 5 of the piston 4. At the same time, the second piston chamber 8 is connected through an additional hydraulic line 12 and a hydraulic rotary connector 22 to a low pressure area, which in the present case corresponds to an oil sump of the transmission and in the area of which an actuating pressure $P^\infty$ is present, which essentially corresponds to the ambient pressure of the transmission. Due to the actuating movement of the piston 4 starting from the second end position in the direction of the first end position, the hydraulic fluid volume present in the second pressure chamber 8 is conducted through the additional hydraulic line 12 in the direction of the low-pressure area. In addition, due to the volume reduction of the additional pressure chamber 9, the hydraulic fluid volume present in the area of the additional pressure chamber 9 is conducted through the hydraulic line 10 from this in the direction of the second pressure chamber 8, and from there is forwarded in the direction of the low-pressure area.

With an increasing actuating path of the piston 4 in the direction of the first end position, the cylinder 3 more and more covers an outlet area 13 of the hydraulic line 10 in the additional pressure chamber 9, by which the volume flow of hydraulic fluid guided through the hydraulic line 10 from the additional pressure chamber 9 in the direction of the second pressure chamber 8 is throttled. The throttling of the volume flow of hydraulic fluid that is able to be conducted from the additional pressure chamber 9 results in a pressure increase in the area of the additional pressure chamber 9 and thereby ultimately the desired throttling or damping, as the case may be, of the actuating speed of the piston 4 in the direction of the first end position.

A driving pin 15 connecting the piston 4 to the cylinder 3 and to a shifting element half 14 of the positive-locking shifting element 2 is arranged in an elongated hole 16 of the cylinder 3 and, together with the cylinder 3, defines both the first end position and the second end position of the piston 4. Thereby, the driving pin 15 makes contact in the first end position of the piston 4 at a first end 17 of the elongated hole 16, and in the second end position at an opposite end 18 of the elongated hole 16 of the cylinder 3.

In order to implement a displacement of the piston 4 starting from the first end position in the direction of the second end position, with the smallest possible delay compared to the displacement of the piston 3 starting from the second end position in the direction of the first end position, with the first embodiment of the hydraulic actuating device 1 presented in FIG. 1 and FIG. 2, the outlet area 13 of the hydraulic line 10 is not completely locked or covered, as the case may be, by the cylinder 3 in the first end position of the piston 4. Thus, upon a displacement of the piston 4 starting from the first end position in the direction of the second end position of the piston 4 in the area of the second active surface 7 of the piston 4, and also in the area of an additional active surface 19 of the piston 4, which with the cylinder 3 bounds the additional pressure chamber 9, the piston 4 is subjected with actuating pressure p_B, while the first pressure chamber 6 is connected through the hydraulic line 11 to the low-pressure area.

With the embodiment of the hydraulic actuating device 1 shown in FIG. 1 and FIG. 2, the sum of the areas of the first active surface 7 and the additional active surface 19 is equal to the area of the first active surface 5. It is thereby achieved that, with an outlet area 13 of the hydraulic line 10 completely unblocked by the cylinder 3 and with a correspondingly adjusted actuating pressure p_B, the piston 4 is subjected to approximately the same actuating force in the direction of the second end position, as this is the case with a displacement of the piston 4 in the direction of the first end position.

Depending on the particular application, there is also the possibility of connecting the additional pressure chamber 9 through several hydraulic lines 10 to the second pressure chamber 8 to the extent described above.

Figure 3:
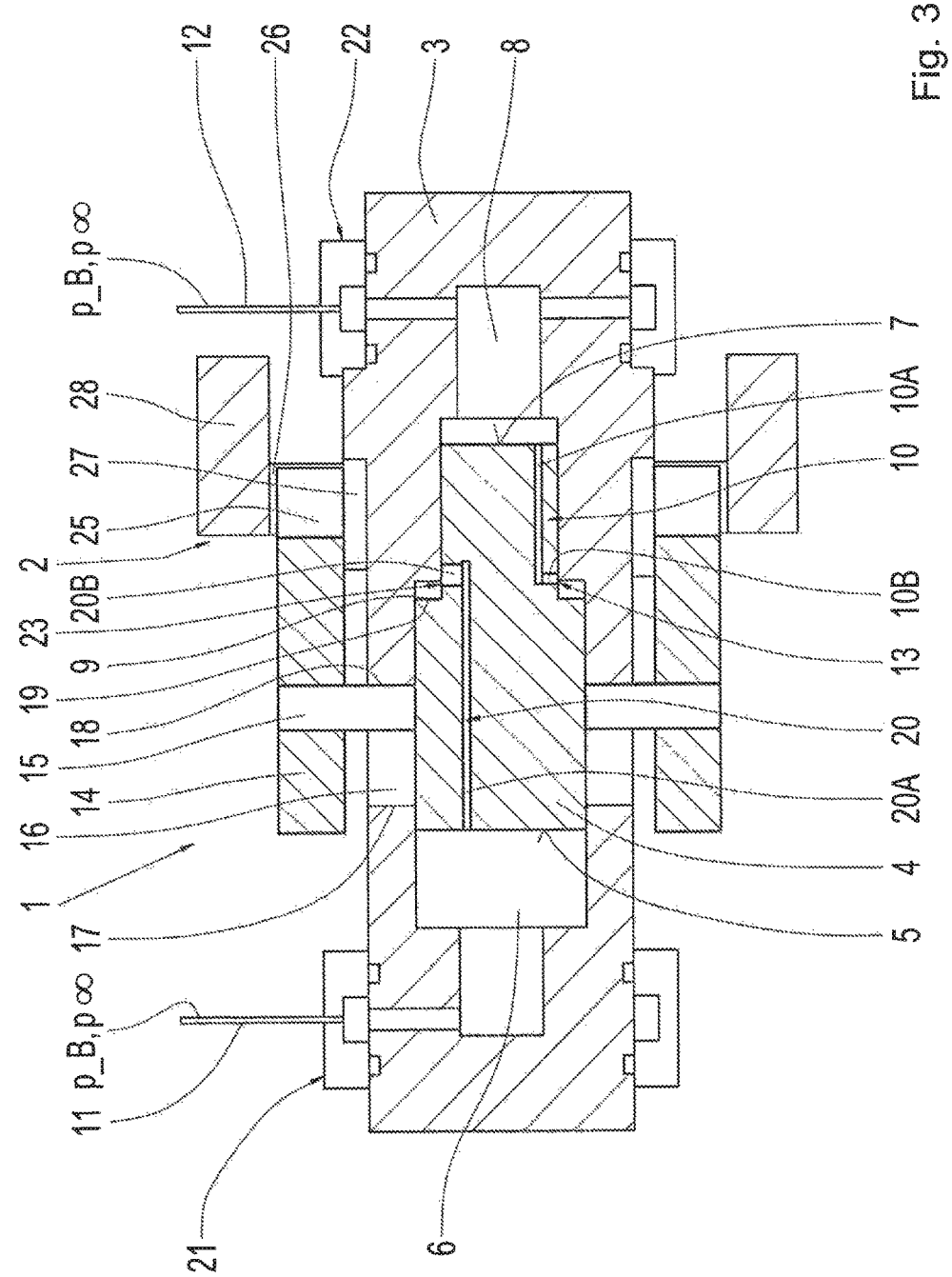
FIG. 3 a presentation corresponding to FIG. 1 of a second embodiment of the hydraulic actuating device in a first operating state.
Figure 4:
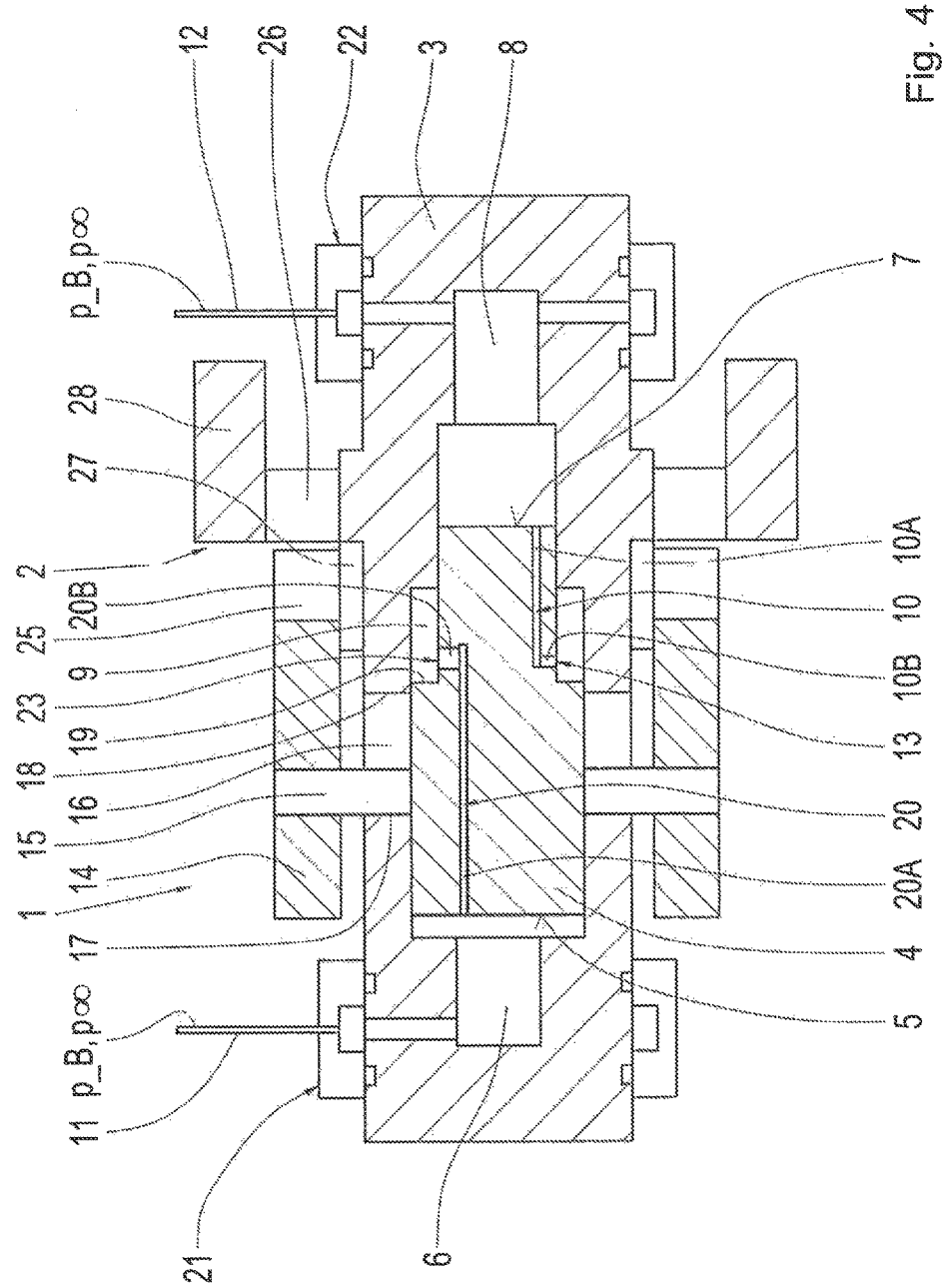
FIG. 4 the hydraulic actuating device in accordance with FIG. 3 in a second operating state.

FIG. 3 and FIG. 4 show a second embodiment of the hydraulic actuating device 1 that essentially corresponds to the first embodiment of the hydraulic actuating device 1 shown in FIG. 1 and FIG. 2. Therefore, the following description essentially more specifically describes only the differences between the two embodiments of the hydraulic actuating device and, with respect to the additional functioning of the hydraulic actuating device in accordance with FIG. 3 and FIG. 4, makes reference to the preceding description at FIG. 1 and FIG. 2.

FIG. 3 shows the piston 4 once again in the first end position, while, in FIG. 4, the piston 4 is shown in the second end position. With the second embodiment of the hydraulic actuating device 1, the additional pressure chamber 9 is connected through the hydraulic line 10 to the second pressure chamber 8 to the extent described above. In addition, the additional pressure chamber 9 is also in operative connection with the first pressure chamber 6 through an additional hydraulic line 20. In the second end position of the piston 4 shown in FIG. 4, an outlet area 23 of the additional hydraulic line 20 is partially covered by the cylinder 3 in the additional pressure chamber.

The hydraulic line 20 connecting the first pressure chamber 6 to the additional pressure chamber 9 in turn includes a first line section 20A extending essentially in an axial direction of the piston 4 into the piston 4 and a second line section 20B leading from the first line section 20A in the direction of the additional pressure chamber 9 and flowing into it, whereas the flow cross-section of the first line section 20A is smaller than the flow cross-section of the second line section 20B.

Upon the presence of a corresponding request for locking the positive-locking shifting element 2, the piston 4 in the area of its first active surface 5 is subjected with actuating pressure p_B, by which the piston 4 is moved from the second end position shown in FIG. 4 in the direction of the first end position shown in FIG. 3. This actuating movement of the piston 4 causes a reduction in the volume of the additional pressure chamber 9, which is why the hydraulic fluid present in the additional pressure chamber 9 is increasingly pushed out through the additional hydraulic line 20 in the direction of the first pressure chamber 6. In addition, hydraulic fluid is also conducted from the additional pressure chamber 9 through the hydraulic line 10 in the direction of the second pressure chamber 8. Shortly prior to reaching the first end position of the piston 4, the outlet area 23 is once again covered by the cylinder 3, by which the return flow of the hydraulic fluid from the additional pressure chamber 9 in the direction of the first pressure chamber 6 is throttled. As a result, shortly prior to reaching the first end position of the piston 4, a pressure increase in the additional pressure chamber 9 and the actuating movement of the piston 4 is decelerated to the desired extent.

The second embodiment of the hydraulic actuating device 1 in accordance with FIG. 3 and FIG. 4 also offers the advantage that, due to the return flow of hydraulic fluid from the additional pressure chamber 9 into the first pressure chamber 6 caused by the actuating movement of the piston 4 in the direction of the first end position, the oil stream to be delivered for generating the actuating pressure p_B from a hydraulic source can be designed to be smaller. Thus, the load on the hydraulic source is reduced during the actuation of the piston 4, and declines in system pressure during the displacement of the piston 4, and thus the displacement of the positive-locking shifting element 2, occur to a lesser extent.

In the quasi-steady state of the hydraulic actuating device 1 in accordance with FIG. 3 and FIG. 4, at which the actuating speed of the piston 4 is essentially constant, the actuating force applied at the piston 4 during a displacement of the piston in the direction of the end position of the piston 4 corresponds to the product of the actuating pressure p_B and the area of the first active surface 5. The actuating force is also equal to the sum of the product of the pressure in the additional pressure chamber 9 and the area of the additional active surface 19 of the piston 4, and the product of the pressure in the second pressure chamber 8, which at that point is essentially equal to the pressure in the low-pressure area, and the area of the second effective surface 8. If the line resistance in the area between the second pressure chamber 8 and the low-pressure area is essentially equal to zero, the pressure acting in the second pressure chamber 8 is also essentially zero. If the area of the additional active surface 19 is smaller than the area of the first active surface 5, during an actuating movement of the piston 4 in the direction of the first end position, the pressure in the area of the additional pressure chamber 9 is always greater than the actuating pressure p_B. If the two pressure chambers 9 and 6 are connected to each other through the additional hydraulic line 20, the desired return flow takes place from the additional pressure chamber 9 in the direction of the first pressure chamber 6.

Depending on the particular application in the present case, there is also the possibility that the hydraulic actuating device 1 in accordance with FIG. 3 and FIG. 4 is designed only with the additional hydraulic line 20; i.e., without the hydraulic line 10. Moreover, with one arrangement of the hydraulic actuating device 1 that does not have the hydraulic line 10, the actuating movement of the piston 4 can be reduced to the desired extent prior to reaching the first end position of the piston 4, and is able to be dampened to the extent necessary for avoiding the disadvantages known from practice.

Modifications and variations can be made to the embodiments illustrated or described herein without departing from the scope and spirit of the invention as set forth in the appended claims.

REFERENCE SIGNS

1 Hydraulic actuating device
2. Positive-locking shifting element
3 Cylinder
4 Piston
5 First active surface
6 First pressure chamber
7 Second active surface
8 Second pressure chamber
9 Additional pressure chamber
10 Hydraulic line
10A, B Line section
11 Hydraulic line
12 Additional hydraulic line
13 Outlet area of the hydraulic line 10
14 Shifting element half of the positive-locking shifting element
15 Driving pin
16 Elongated hole
17 First end of the elongated hole
18 Second end of the elongated hole
19 Additional active surface of the piston
20 Additional hydraulic line
20A, B Line section
21, 22 Hydraulic rotary connector
23 Outlet area of the additional hydraulic line
25, 26 Claw toothing
27 Guide toothing
28 Shifting element half of the positive-locking shifting element
p_B Actuating pressure
P$^\infty$ Pressure of the low-pressure area

The invention claimed is:

1. A hydraulic actuating device for a positive-locking shifting element of a transmission, comprising:

a cylinder;
a piston arranged in displaceable manner in the cylinder between a first end position that corresponds to a closed operating state of the shifting element, and a second end position that corresponds to an open operating state of the shifting element;
the piston displaceable by applying actuating pressure at a first active surface of a first pressure chamber bounded by the cylinder in a direction of the first end position;
the piston also displaceable by applying actuating pressure at a second active surface of a second pressure chamber bounded by the cylinder in a direction of the second end position;
the piston designed as a stepped piston that, with the cylinder, bounds an additional pressure chamber that is connected to one or both of the first pressure chamber and the second pressure chamber through at least one hydraulic line defined across an actuating path of the piston, wherein a volume of the additional pressure chamber decreases during an actuating movement of the piston towards the first end position and increases during an actuating movement of the piston towards the second end position;
wherein the hydraulic line connection between the additional pressure chamber and the first pressure chamber or the second pressure chamber in the first end position of the piston is at least partially blocked by the cylinder, and a degree of such blocking by the cylinder increases as the piston moves towards the first end position; and
wherein the additional pressure chamber is bounded by the cylinder and comprises an additional active surface, an area of the second active surface being larger than an area of the additional active surface.

2. The hydraulic actuating device according to claim 1, wherein the hydraulic line connects the second pressure chamber to the additional pressure chamber, the hydraulic line including a first line section extending in an axial direction into the piston and a second line section leading from the first line section into the additional pressure chamber, the first line section having a flow cross-section that is larger than a flow cross-section of the second line section.

3. The hydraulic actuating device according to claim 1, wherein the hydraulic line connects the first pressure chamber to the additional pressure chamber, the hydraulic line including a first section extending essentially in an axial direction into the piston and a second line section leading from the first line section into the additional pressure chamber.

4. The hydraulic actuating device according to claim 1, wherein a sum of the areas of the second active surface and the additional active surface is equal to the area of the first active surface.

* * * * *